United States Patent [19]

Iljin

[11] Patent Number: 4,905,962
[45] Date of Patent: Mar. 6, 1990

[54] FAST-ACTING ELECTROMAGNETIC SOLENOID VALVE

[75] Inventor: Jorge E. Iljin, Simi Valley, Calif.

[73] Assignee: Kaiser Aerospace & Electronics Corp., Oakland, Calif.

[21] Appl. No.: 245,130

[22] Filed: Sep. 15, 1988

[51] Int. Cl.[4] .............................................. F16K 31/06
[52] U.S. Cl. ................ 251/129.16; 239/585; 251/129.21
[58] Field of Search ............... 251/129.15, 129.16, 251/129.17, 129.18, 129.2, 129.21; 239/585

[56] References Cited

U.S. PATENT DOCUMENTS

| | | | |
|---|---|---|---|
| 2,321,853 | 6/1943 | Ray | 251/129.16 |
| 2,548,239 | 4/1951 | Ray | 251/129.16 |
| 2,631,612 | 3/1953 | Buescher | 251/129.16 |
| 3,960,361 | 6/1976 | York | 251/129.16 |
| 4,356,980 | 11/1982 | Krauss | 251/129.21 |
| 4,365,747 | 12/1982 | Knapp et al. | 251/129.17 |
| 4,390,130 | 6/1983 | Linssen et al. | 251/129.16 |
| 4,534,381 | 8/1985 | Hozumi et al. | 251/129.2 |
| 4,561,631 | 12/1985 | Slavin et al. | 251/129.2 |
| 4,572,436 | 2/1986 | Stettner et al. | 251/129.16 |

FOREIGN PATENT DOCUMENTS 1322184  7/1973  United Kingdom ........... 251/129.21

*Primary Examiner*—George L. Walton
*Attorney, Agent, or Firm*—Marvin H. Kleinberg; Don C. Lawrence

[57] ABSTRACT

The valve includes an electromagnet having a pole face inclined at an angle to a disk-shaped poppet or valve plate to define a wedge-shaped air gap therebetween. A peripheral housing surrounds the plate and extends between the pole face and a planar floor below the plate to define a chamber within which the plate is loosely captivated for pivotal movement about an edge of the plate disposed at the thin end of the gap. The floor contains a valve seat disposed toward the thick end of the gap so that the plate experiences its maximum stroke in the vicinity of the seat, thus resulting in a faster-acting valve for a given effective stroke length.

14 Claims, 1 Drawing Sheet

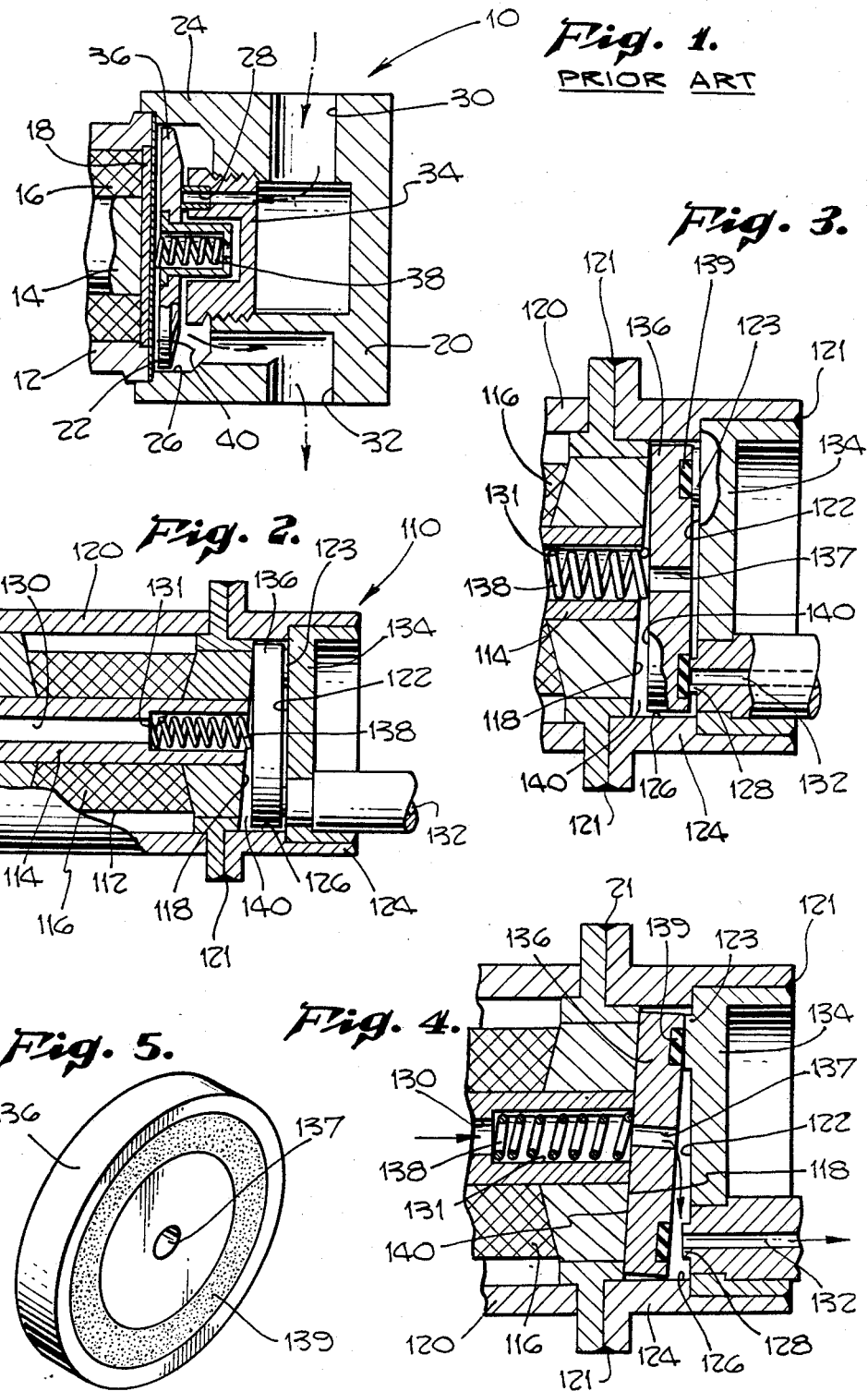

FAST-ACTING ELECTROMAGNETIC SOLENOID VALVE

BACKGROUND OF THE INVENTION

1. Field of the Invention

This invention pertains to fluid control devices in general, and in particular, to a form of fast-acting, electromagnetic solenoid valve.

2. Description of the Related Art

Electromagnetically actuated solenoid or relay valves have fairly widespread application in the field of fluidics and fluid control, wherein their speed of operation and precise controllability are important factors. Examples of such use are the fuel injector valves used in modern internal combustion engines and the fuel control valves used in liquid rocket engines.

One known type of such valve employs a bipolar electromagnet to selectably pull a moveable magnetic armature or valve element, such as a ferrous poppet plate, through an air gap or stroke and away from its position of normally biased engagement with a static valve seat to open the valve and initiate flow. An example of this type of valve structure may be seen in U.S. Pat. No. 2,321,853 to W. A. Ray.

In such valve types, fluid flow response time is a function of, among other things, the length of the poppet stroke. As a first approximation, longer stroke lengths result in larger flows but slower actuation times, and vice-versa. Over the years, efforts have been made to derive faster-acting valves which still retain relatively large flow characteristics.

One such effort is that of H. Knapp, et al., described in U.S. Pat. No. 4,365,747, in which the armature carries a valve element acting in cooperation with a fixed, centrally located valve seat, and is guided into seating engagement by a guide diaphragm made of non-magnetic material attached to its outer circumference, which is said to prevent magnetic adhesion of the armature.

In U.S. Pat. No. 4,390,130, M. Linssen, et al., disclose a similar arrangement in which a ball element is attached to the center of a flat armature which, in turn, is pivotally attached at its side by a spring tongue, thereby resulting in an unequivocal up-or-down movement of the armature.

In U.S. Pat. No. 4,572,436, E. Stettner, et al., disclose such a valve in which the armature valve plate is tapered on its top, or solenoid-facing surface to create a wedge-shaped air gap between it and the solenoid. The valve plate is retained both radially and axially by a special retainer clip to move pivotally about a peripheral edge into, and out of, engagement with orifices contained within a valve seat.

It will be seen that such pivoting-armature arrangements can result in a relatively larger axial movement of the armature plate in the vicinity of the valve seat for a given mean, or average, armature stroke, or alternatively, a faster opening response for a given effective armature displacement, either one a desirable result. However, these prior executions of this concept have been hindered by the necessity of some artifice to maintain a precise, fixed angular relationship between the valve plate and the seat, such as the alignment springs, clips, balls, pins or the like discussed in these references. The latter elements result in increased manufacturing costs, increased complexity, and reduced reliability in this type of valve.

It is therefore desirable to provide an electromagnetic solenoid valve of the type discussed hereinabove which affords faster response times and/or larger armature displacements in the vicinity of the valve seat for a given mean poppet displacement, while eliminating the necessity for the precise and complex valve member and seat aligning means of the prior art.

SUMMARY OF THE INVENTION

It has been discovered that these advantages, and others, can be obtained in a solenoid valve of the type discussed above by the provision of a flat armature or poppet plate disposed between a floor having a valve seat in it and an electromagnet having a pole face which is inclined relative to the plate such that a wedge-shaped air gap is created therebetween. Peripheral walls extending between the floor and the pole face define a chamber which serves to captivate the plate for pivotal movement between the floor and the pole face about an edge disposed at the thin end of the gap without the necessity of precision armature-retaining and aligning elements. By locating the valve seat in the floor at the other side of the gap, i.e., at its thick end, a relatively larger displacement between the plate and seat results for a given average poppet stroke, or alternatively, a given displacement at the seat can be obtained from a much shorter, and hence faster, stroke.

A better understanding of the invention, its operation and advantages may be obtained from a consideration of the following detailed description of an exemplary preferred embodiment thereof, particularly if read in conjunction with the figures of the accompanying drawings, wherein:

BRIEF DESCRIPTION OF THE DRAWINGS

FIG. 1 is a side, cross-sectional view of an electromagnetic solenoid valve of the prior art;

FIG. 2 is a side, partial cross-sectional view of an exemplary preferred embodiment of an electromagnetic solenoid valve in accordance with the present invention;

FIG. 3 is an enlarged side, cross-sectional view of the solenoid valve shown in FIG. 2, in which the valve is shown in the normally closed condition;

FIG. 4 is similar to FIG. 3, except that the valve is shown in an energized, i.e., open condition; and FIG. 5 is an isometric view of the armature or valve plate of the novel valve shown in FIGS. 2-4.

DETAILED DESCRIPTION OF THE PREFERRED EMBODIMENTS

In FIG. 1, a prior art electromagnetic solenoid valve 10 of a type having relevance to the instant invention is illustrated in a side, cross-sectional view.

The valve 10 includes a bipolar electromagnet 12 of conventional construction at one end (shown broken away). The electromagnet 12 includes a long, or polar axis, and a bobbin or spool 14 of a magnetically-inductable material, e.g., soft iron, about which is wound a plurality of current-carrying windings 16. A flat pole piece or face 18 is disposed at one end of the spool for the induction of a magnetic field therein by the electromagnet. A flux return path can be provided via a surrounding magnetic casing or magnetic housing.

A valve housing 20 is disposed at the end of the valve 10 opposite to the electromagnet 12. The housing 20 includes a floor 22 spaced apart from the pole face 18 of the electromagnet by peripheral sidewalls 24 that extend over to the pole face and define an internal fluid chamber 26. A valve seat 28 having one or more fluid openings through it is disposed within the floor 22, and fluid communication means, such as the inlet 30 and outlet 32, are provided in the housing for fluid to flow into and out of the chamber 26 through the valve seat 28 as, for example, in the direction of the dotted arrows in FIG. 1. It will be noted that, in the prior art valve 10 illustrated, the spacing between the floor 22 and the pole face 18 can be made adjustable by the use of a plug 34 which screws axially into the tapped housing 20 by mean of axial threads.

Disposed intermediate the pole face 18 and the floor 22 is a poppet or valve plate 36 made of a magnetically conducting material which is axially moveable between positions of sealing engagement and opening disengagement with the valve seat 28. Normally, the plate 36 is biased closed by the compression spring 38 such that an "air gap" exists between the plate and the pole face 18. When the electromagnet 12 is energized, the plate is pulled away from the valve seat and against the spring by the magnetic field induced in the pole face through the gap, or stroke, such that the valve seat is opened for fluid flow.

Skilled practitioners will recognize that, all other things remaining the same, and for stroke lengths on the order of the mean diameter of the opening in the valve seat 28, the longer the stroke of the plate 36, the greater will be the separation between the plate and the valve seat when open. Hence, the lesser will be the resistance to fluid flow through the valve seat. However, as the magnetic force acting upon the plate to accelerate it away from the valve seat is inversely proportional to the cube of the distance between the pole face and the valve plate, the longer the stroke, the lower will be the plate's initial acceleration away from the seat, and the longer it will take to traverse the stroke, and hence, the slower will be valve's response time. Thus, it would be desireable if the stroke or displacement of the plate in the vicinity of the valve seat could be kept the same while, simultaneously, the average or mean stroke length were reduced. While variable-gap valves are available, they typically require complicated and expensive armature-aligning devices, such as balls, springs, clips, etc. to ensure a precise alignment of the armature with the valve seat.

It has been discovered that this can be accomplished by inclining the pole face 18, rather than the armature, from its usual orthogonal relationship to the polar axis of the magnet or relative to its usual parallel relationship to the plate 36 such that a wedge-shaped air gap is created therebetween. If the plate is then captivated to move pivotally through the gap about an edge disposed at the thin end of the gap, and the valve seat 28 is disposed at the thick end of the gap, a faster acting valve for a given effective stroke length will result.

An exemplary preferred embodiment of such a desireable electromagnetic solenoid valve 110 is illustrated in cross-section in FIGS. 2-4, wherein elements similar or analogous to those in the prior art valve are numbered similarly, plus 100.

The exemplary valve 110 illustrated comprises a cylindrical solenoid, or electromagnet 112, which has a polar axis disposed coaxially within one end of an annular housing 120. The electromagnet includes a planar pole face 118 which is inclined at an angle relative to a plane orthogonal to the polar axis of the electromagnet.

Spaced apart from, and facing toward, the pole face 118 is a circular floor 122, which is part of a closure plug 134 disposed generally orthogonal to the assembly's axis at the other end of the housing 120 from the solenoid. The peripheral walls 124 of the housing extend axially between the outer periphery of the pole face 118 and that of the floor 122 and define a circular chamber 126 within which a generally planar, disk-shaped poppet or valve plate 136 made of a magnetically-permeable material is loosely captivated for pivotal movement between the pole face and a valve seat 128 disposed in the floor. Biasing means, e.g., a compression spring 138 extending between the pole face and the plate normally urges the plate toward the floor.

The floor 122 is held spaced apart from the pole face 118 by a distance which, at a point closest to the pole face, is just slightly larger than the thickness of the valve plate 136, and the inner diameter of the circular chamber 126 is slightly larger than the outer diameter of the plate 136. This serves to limit the valve plate 136 to pivotal movement within the chamber 126 without the need for complicated pins, springs, locating balls or the like, and the plate 136 is free to rotate within the chamber 126 about the axis of the assembly without adversely effecting its operation.

Since the pole face 118 is inclined relative to the valve plate 136, a wedge-shaped stroke or gap 140 is created between the two when the valve is closed, as illustrated in FIGS. 2 and 3. It will be seen that the valve plate 136 pivots about an edge disposed at the thin end of the gap 140 when the electromagnet 112 is energized to open the valve seat 128, as illustrated in FIG. 4. If the valve seat 128 is positioned in the floor 122 at the thick end of the gap 140, i.e., diametrically opposite to the pivoting edge of the plate 136, the maximum stroke of the plate 136 will occur above the seat 128. Thus, a relatively large effective stroke is achieved in the vicinity of the seat 128 with valve which has a relatively shorter average stroke and which is therefore faster acting.

In the exemplary embodiment illustrated, the housing 120 comprises a plurality of simple, machined ring members which can be slipped together at assembly, then connected and hermetically sealed by means of, for example, tungsten-inert-gas (TIG) welds 121, as illustrated in the figures.

As additional features, the spool 114 of the exemplary solenoid valve 110 may fabricated with a hollow core to include an inlet conduit 130 opening to the chamber 126. This permits the fluid controlled by the valve to be utilized as a cooling medium for the windings 116 of the electromagnet 112. Where this cooling arrangement is incorporated, it is necessary to provide the valve plate 136 with an opening or orifice 137 in communication with the inlet conduit 130 when the valve is open in order to permit the fluid to flow past the plate 136 and into the chamber 126 before exiting through the valve seat 128, as indicated by the solid arrows in FIG. 4. Also, where this arrangement is incorporated, it may be convenient to provide the conduit 130 with a counterbore 131 where it opens through the pole face into the chamber 126 to serve as a means for retaining the compression spring 138, as illustrated.

In a positively sealing valve 110, it may be desirable to provide the valve seat 128 with a lip 129 raised above the floor 122, as best seen in FIG. 4, along with a cooperating annular sealing gasket 139 made of a resilient material, such as neoprene, let into the face of the valve plate 136, as best illustrated in the isometric view thereof in FIG. 5. Such a valve seat 128 can be easily machined at the end of a piece of tubing, such as at the end of the outlet conduit 132 illustrated, and welded or brazed into an opening through the floor. Where this sealing arrangement is adopted, it is desirable to include a pivot pedestal 123 disposed at the narrow end of the gap 140 at a height above the floor 122 equal to the height of the raised lip of the valve seat 128.

By now, skilled practitioners will recognize that other modifications in terms of materials, element arrangement, and methods of fabrication and assembly are possible, and may be desirable, depending upon the particular problem at hand. For example, although the valve 110 of the present invention is illustrated as generally cylindrical in shape, it need not necessarily be so. Likewise, although illustrated as a normally-closed valve, by suitable rearrangement of elements, a normally-open version can be provided. Elements characterized as "inlets" can be recharacterized as "outlets," and vice-versa.

Accordingly, the embodiments illustrated herein should be considered as exemplary in nature only, and the scope of the present invention limited only by that of the claims appended hereafter.

What is claimed is:

1. An improved electromagnetic solenoid valve of the type which includes a valve seat, a planar valve plate of ferrous material moveable between positions of closing engagement and opening disengagement with the seat, biasing means for normally urging the plate into closing engagement with the seat, and an electromagnet having a pole face normally spaced apart from and facing the plate to pull the plate away from the seat when the electromagnet is energized, wherein the improvement comprises:
   the pole face being inclined relative to the valve plate such that a wedge-shaped gap is defined therebetween when said valve plate is spaced from said inclined pole face and said valve plate engages valve seat, said gap having a thick end and a thin end;
   the valve plate being captivated for pivotal movement through the gap about a pivoting edge disposed at said thin end of said gap when the electromagnet is energized and said valve plate engages said inclined pole face with the gap now being formed between the valve plate and the valve seat for allowing passage of fluid therein and out through said valve seat; and
   the valve seat being disposed away from said pivoting end of the plate and toward said thick end of said gap, whereby the valve plate experiences its maximum stroke in the vicinity of the valve seat, thus resulting in a faster acting valve for a given effective stroke length.

2. The solenoid valve of claim 1, wherein the valve seat further comprises a planar floor spaced apart from the pole face and having a fluid opening extending therethrough sealable by engagement with the valve plate.

3. The solenoid valve of claim 2, further comprising a housing having side walls extending between the floor and the pole plate to define a chamber therebetween, said chamber loosely captivating the valve plate for pivotal movement between said floor and the pole face.

4. The solenoid valve of claim 3, wherein said chamber and the valve plate are generally circular in cross-section.

5. The solenoid valve of claim 3, wherein the valve plate has an annular, elastomeric sealing portion disposed in a face adjacent to said floor to seal the valve seat.

6. The solenoid valve of claim 5, wherein the valve seat further comprises a lip raised above said floor, and said floor further includes a pedestal opposite the valve seat for the valve plate to pivot upon.

7. The solenoid valve of claim 3, wherein the electromagnet further comprises:
   a spool of magnetically inductable material having an end flange comprising the pole face, a magnetic return path surrounding said spool, a hollow core defining a fluid conduit having an opening through the pole face into said chamber, and a plurality of electrical windings wound about said core.

8. The solenoid valve of claim 7, wherein the biasing means further comprise a compression spring having a first end engaged within said conduit and a second end in contact with the valve plate.

9. A fast-acting electromagnetic solenoid valve, comprising:
   a valve seat comprising a circular floor having a fluid opening through it;
   a disk-shaped, magnetizable valve plate disposed above said floor and moveable between positions of closed engagement and open disengagement with said opening;
   means for biasing said valve plate into normally closed engagement with said opening;
   an electromagnet having a planar pole face disposed above said plate and inclined at an angle relative thereto such that a circular, wedge-shaped gap is defined therebetween when said valve plate is spaced from said inclined pole face and said valve plate engages said valve seat, said gap having a thick end disposed above said fluid opening and a thin end diametrically opposite thereto;
   a housing having walls extending circumferentially about said floor and said pole face and defining a chamber therebetween, said chamber acting to captivate said plate loosely therein for pivotal movement about an edge of said plate disposed at said thin end of said gap when the solenoid valve is energized and said valve plate engages said inclined pole face with the gap now being formed between the valve plate and the valve seat for allowing passage of fluid therein and out through said valve seat; and
   the valve seat being disposed away from said pivoting end of the plate and toward said thick end of said gap, whereby the valve plate experiences its maximum stroke in the vicinity of the valve seat, thus resulting in a faster-acting valve for a given effective stroke length.

10. The valve of claim 9, wherein said valve plate includes a resilient circular gasket radially positioned to engage and seal said opening.

11. The solenoid valve of claim 10, wherein said valve seat further comprises a raised lip extending above said floor, said floor having a valve plate pivot pedestal extending thereabove at the same height as said raised lip and disposed diametrically opposite thereto, and wherein said valve plate engages and seals said valve seat raised lip when said valve is in a closed condition.

12. The valve of claim 9, wherein said electromagnet further comprises:

a spool of magnetically inductable material having an end flange comprising said pole face, a hollow core defining a fluid conduit opening through said pole face into said chamber, a plurality of electrical windings wound about said core, and a magnetic flux return path concentric with said core.

13. The valve of claim 12, wherein said biasing means further comprise a compression spring having a first end engaged within said conduit and a second end in contact with said valve plate.

14. The solenoid valve of claim 13, wherein said valve plate further includes at least one fluid opening therethrough at about its center.

* * * * *